(12) United States Patent
Lim

(10) Patent No.: US 11,310,635 B2
(45) Date of Patent: Apr. 19, 2022

(54) METHOD, APPARATUS, AND PROGRAM FOR AUTOMATICALLY SELECTING MESSAGE TRANSMISSION CHANNEL AND TRANSMITTING MESSAGE

(71) Applicant: ENIGMA CO., LTD., Seongnam-si (KR)

(72) Inventor: Hyun Jin Lim, Geumcheon-gu (KR)

(73) Assignee: ENIGMA CO., LTD., Seongnam-si (KR)

( * ) Notice: Subject to any disclaimer, the term of this patent is extended or adjusted under 35 U.S.C. 154(b) by 0 days.

(21) Appl. No.: 16/638,464

(22) PCT Filed: Jan. 8, 2019

(86) PCT No.: PCT/KR2019/000277
§ 371 (c)(1),
(2) Date: Feb. 11, 2020

(87) PCT Pub. No.: WO2020/004753
PCT Pub. Date: Jan. 2, 2020

(65) Prior Publication Data
US 2021/0105588 A1 Apr. 8, 2021

(30) Foreign Application Priority Data
Jun. 28, 2018 (KR) ........................ 10-2018-0074774

(51) Int. Cl.
*H04W 4/12* (2009.01)
*H04W 72/04* (2009.01)
(Continued)

(52) U.S. Cl.
CPC ......... *H04W 4/12* (2013.01); *H04W 72/0453* (2013.01); *H04W 72/10* (2013.01); *H04W 88/184* (2013.01)

(58) Field of Classification Search
CPC .... H04W 4/12; H04W 72/0453; H04W 72/10
See application file for complete search history.

(56) References Cited

U.S. PATENT DOCUMENTS

| 10,951,502 B1* | 3/2021 | Kamichoff | ............ H04L 49/552 |
| 2008/0039070 A1* | 2/2008 | Ptashek | ................. H04W 24/06 |
| | | | 455/423 |

(Continued)

FOREIGN PATENT DOCUMENTS

| KR | 1020120064278 A | 6/2012 |
| KR | 1020130041057 A | 4/2013 |

(Continued)

OTHER PUBLICATIONS

PCT International Search Report issued in corresponding PCT Application No. PCT/KR2019/000277 dated Apr. 19, 2019, 4 pages.

*Primary Examiner* — Barry W Taylor
(74) *Attorney, Agent, or Firm* — Weber Rosselli & Cannon LLP

(57) ABSTRACT

Disclosed is a method for automatically selecting a message transport channel and transmitting a message, including obtaining message information on a transmission target message, obtaining receiver information including at least one of information on a receiver of the message and information on a device of the message, obtaining information on one or more reception-available channels based on the message information and receiver information, selecting at least one of the one or more reception-available channels, and transmitting the message through the selected channel.

15 Claims, 7 Drawing Sheets

(51) Int. Cl.
*H04W 72/10* (2009.01)
*H04W 88/18* (2009.01)

(56) References Cited

U.S. PATENT DOCUMENTS

| | | | | |
|---|---|---|---|---|
| 2008/0294735 | A1* | 11/2008 | Muntermann | H04L 51/14 709/206 |
| 2012/0124146 | A1* | 5/2012 | Hsiao | H04L 51/36 709/206 |
| 2013/0293363 | A1* | 11/2013 | Plymouth | H04L 63/1425 340/309.16 |
| 2015/0044983 | A1* | 2/2015 | Nasir | H04W 4/029 455/404.2 |
| 2019/0158434 | A1* | 5/2019 | Bhatt | H04L 51/043 |
| 2019/0342725 | A1* | 11/2019 | Shirazi | H04M 15/8221 |
| 2021/0034595 | A1* | 2/2021 | Tselikis | H04L 67/26 |

FOREIGN PATENT DOCUMENTS

| | | |
|---|---|---|
| KR | 1020160073661 A | 6/2016 |
| KR | 1020170034201 A | 3/2017 |
| KR | 1020170087202 A | 7/2017 |

* cited by examiner

METHOD, APPARATUS, AND PROGRAM FOR AUTOMATICALLY SELECTING MESSAGE TRANSMISSION CHANNEL AND TRANSMITTING MESSAGE

TECHNICAL FIELD

The present disclosure relates to a method, apparatus, and program for automatically selecting a message transport channel and transmitting a message.

BACKGROUND ART

Technologies for transmitting messages between terminals has been diversified and, recently, a messenger application using a data communication network as well as text messages (SMS, MMS) has been widely used.

In addition, due to the spread of smartphones, technologies for transmitting messages using various channels and push messages different from the existing ones have been developed and used. These message transport channels have different characteristics according to types, so a cost or system load may be determined according to through which channel a message is transmitted.

SUMMARY

Technical Problem

The present disclosure provides a method, apparatus, and program for automatically selecting a message transport channel and transmitting a message.

Technical objects to be achieved by the present disclosure are not limited to the aforementioned technical objects, and other technical objects not described above may be evidently understood by a person having ordinary skill in the art to which the present disclosure pertains from the following description.

Technical Solution

In one aspect, a method for automatically selecting a message transport channel and transmitting a message includes: obtaining message information on a transmission target message; obtaining receiver information including at least one of information on a receiver of the message and information on a device of the message; obtaining information on one or more reception-available channels based on the message information and receiver information; selecting at least one of the one or more reception-available channels; and transmitting the message through the selected channel.

Furthermore, the selecting of the channel may include determining priorities of at least some of the one or more reception-available channels; and selecting the at least one channel according to the determined priorities.

Furthermore, the determining of the priorities may include determining the priorities based on economical efficiency of each of the one or more reception-available channels.

Furthermore, the transmitting of the message may include: selecting a next-highest channel of the selected channel according to the determined priorities if the message transmitted through the selected channel cannot be provided to the receiver or is not checked by the receiver for a predetermined time or longer; and retransmitting the message through the next-highest channel.

Furthermore, the obtaining of the information on the reception-available channel may include obtaining information on one or more reception-available channels available for transmitting the message based on at least one of a type and a capacity of the message.

Furthermore, the obtaining of the information on the reception-available channel may include: obtaining information on one or more channels that the receiver can receive; obtaining information on whether the receiver allows reception of the one or more channels that the receiver can receive; and obtaining information on one or more reception-available channels that the receiver can receive and that the receiver allows reception.

Furthermore, the obtaining of the information on the reception-available channel may further include: obtaining information on at least one reception-available channel that can be received by a receiver's device based on information on a type of the receiver's device and an application installed in the receiver's device.

Furthermore, the obtaining of the information on the reception-available channel may include: obtaining information on a state of the application installed in the receiver's device; and obtaining information on one or more reception-available channels that can provide notification to the receiver in the receiver's device.

In another aspect, a message transport channel automatically selecting and message transmitting apparatus includes: a memory configured to store one or more instructions; and a processor configured to execute the one or more instructions stored in the memory, wherein the processor performs, by executing the one or more instructions, obtaining message information on a transmission target message; obtaining receiver information including at least one of information on a receiver of the message and information on a device of the message; obtaining information on one or more reception-available channels based on the message information and receiver information; selecting at least one of the one or more reception-available channels; and transmitting the message through the selected channel.

In another aspect, there is provided a computer program stored in a computer-readable recording medium to perform the method according to the disclosed embodiment in combination with a computer as hardware.

Other details of the present disclosure are included in the detailed description and drawings.

Advantageous Effects

According to the disclosed embodiment, by selecting an optimal message transport channel and transmitting a message according to a type of the message, a state of a device, and receiver information, economical efficiency of the message transmission may be maximized and a system load based on the message transmission may be minimized.

Effects which may be obtained by the present disclosure are not limited to the aforementioned effects, and other technical effects not described above may be evidently understood by a person having ordinary skill in the art to which the present disclosure pertains from the following description.

DETAILED DESCRIPTION

Figure 1:
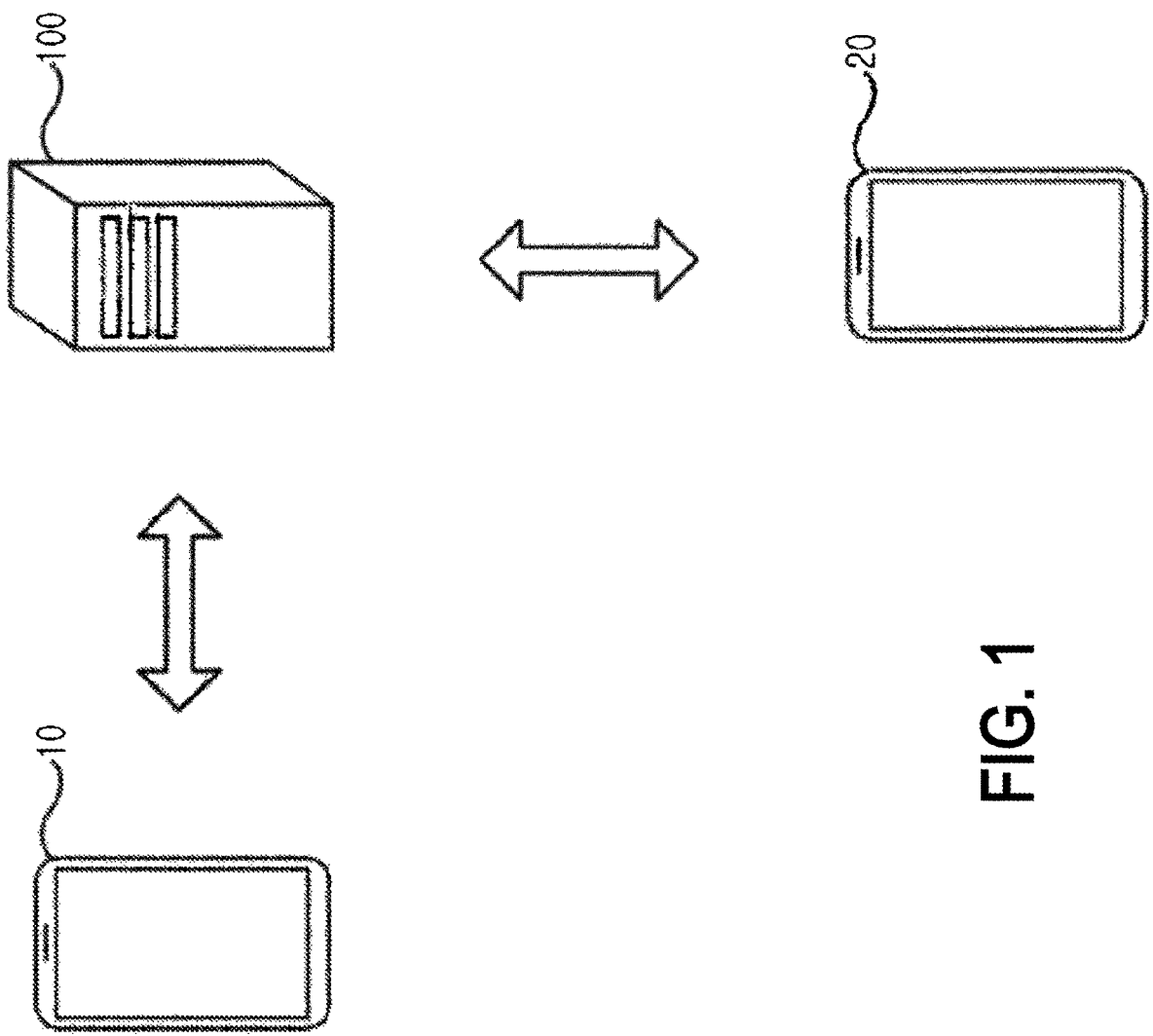
FIG. 1 is a conceptual diagram illustrating a system for automatically selecting a message transport channel and transmitting a message according to an embodiment.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

Terms used in the present disclosure are for explaining exemplary embodiments rather than limiting the present disclosure. Unless explicitly described to the contrary, a singular form includes a plural form in the present disclosure. The word "comprise" and variations such as "comprises" or "comprising," will be understood to imply the inclusion of stated constituents, steps, operations and/or elements but not the exclusion of any other constituents, steps, operations and/or elements. Throughout the disclosure, the like reference numerals denote the substantially same elements, and "and/or" includes each and one or more combinations of mentioned components. It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Unless otherwise defined, all the terms (including technical and scientific terms) used herein have the same meaning as commonly understood by a person skilled in the art to which this invention pertains. Such terms as defined in generally used dictionaries should not be construed to have ideally or excessively formal meanings.

Also, in embodiments of the present disclosure, the term "unit" or "module" used herein, signifies, but is not limited to, a software or hardware component, such as a Field Programmable Gate Array (FPGA) or Application Specific Integrated Circuit (ASIC), which performs certain tasks. A unit or module may advantageously be configured to reside on the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules.

Hereinafter, embodiments of the present disclosure will be described in detail with reference to the accompanying drawings.

FIG. 1 is a conceptual diagram illustrating a system for automatically selecting a message transport channel and transmitting a message according to an embodiment.

Referring to FIG. 1, a server 100, a sender terminal 10 and a receiver terminal 20 communicating with each other through the server 100 are illustrated.

In an embodiment, the sender terminal 10 and the receiver terminal 20 may refer to mobile devices including smartphones but are not limited thereto.

In an embodiment, the sender terminal 10, the receiver terminal 20, and the server 100 may refer to computing devices including at least one processor. For example, the computing devices may include, but are not limited to, smartphones, tablet PCs, desktop computers, laptop computers, and the like.

In an embodiment, the sender terminal 10 may transmit a message to the receiver terminal 20, and the message may be transmitted to the receiver terminal 20 through the server 100 but is not limited thereto. In addition, the sender terminal 10 and the receiver terminal 20 are named based on the roles in an embodiment for delivering a message, and the receiver terminal 20 may also send a message to the sender terminal 10 and there is no difference in hardware configuration or software function of the sender terminal 10 and the receiver terminal 20.

In the present disclosure, a method for automatically selecting a message transport channel and transmitting a message through the selected channel in an embodiment in which the sender terminal 10 transmits a message to the receiver terminal 20 will be described.

At least a part or the entirety of the method for automatically selecting a message transport channel and transmitting a message according to the disclosed embodiment may be performed by both the sender terminal 10 and the server 100, but hereinafter, a subject of each step will be described separately for the purposes of description. However, the subject of each step is not limited by the examples described below and each step may be performed by any kind of computing device.

Figure 2:
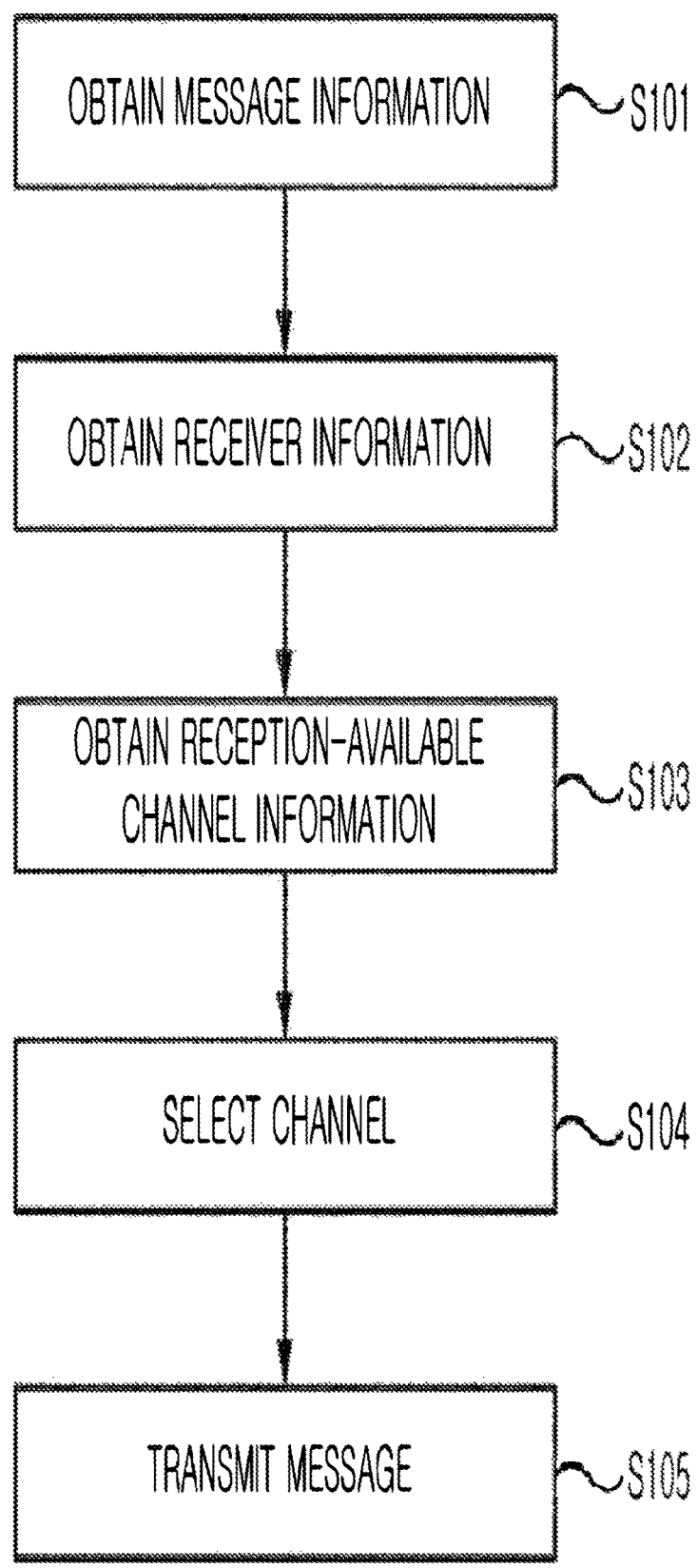
FIG. 2 is a flowchart illustrating a method for automatically selecting a message transport channel and transmitting a message according to an embodiment.

FIG. 2 is a flowchart illustrating a method for automatically selecting a message transport channel and transmitting a message according to an embodiment.

In operation S101, the server 100 receives a message to be transmitted (i.e., a transmission target message) or information on the transmission target message from the sender terminal 10 and obtains message information on the transmission target message.

For example, the message information may include a type of message (e.g., text, image, voice, video, mixed content, etc.), a size of the message (e.g., 80 bytes or less or greater), a short sentence, a long sentence, a symbol, signal information and the like, but is not limited thereto.

In an embodiment, the message information may be obtained based on at least some of a file size, format information, header information, and attribute information of the message, but is not limited thereto.

In operation S102, the server 100 obtains receiver information including at least one of information on a receiver of the message and information on a receiver's device.

For example, the receiver information may include receiver's personal information including information member subscription of the receiver regarding a specific service (e.g., a site or an application), personal information, reception approval information, and the like and device information related to the receiver terminal 20.

For example, the device information may include a type of a device such as a feature phone or a smartphone, network information available to devices such as 2G, 3G, 4G, and 5G, operating system information of devices such as Android, ios, and Windows, and application (program) installed in each device, but is not limited thereto.

In operation S103, the server 100 obtains information on one or more reception-available channels based on the message information and the receiver information.

For example, the information on the reception-available channel may be a push message (e.g., a light-weight message, a mid-weight message, apns, gcm (c2dm), an RCS, a third party push, oma-mms, a third party SNS channel, etc.), a carrier message (e.g., SMS, MMS, etc.), and the like, but is not limited thereto.

In an embodiment, the reception-available channel may refer to a channel capable of transmitting the message based on at least one of a type and a capacity of the message, but is not limited thereto.

In operation S104, the server 100 selects at least one channel among the one or more reception-available channels, and the type of the channel may include at least one of the channels included in the above example, but is not limited thereto.

In operation S105, the server 100 transmits the message to the receiver terminal 20 through the selected channel.

Figure 3:
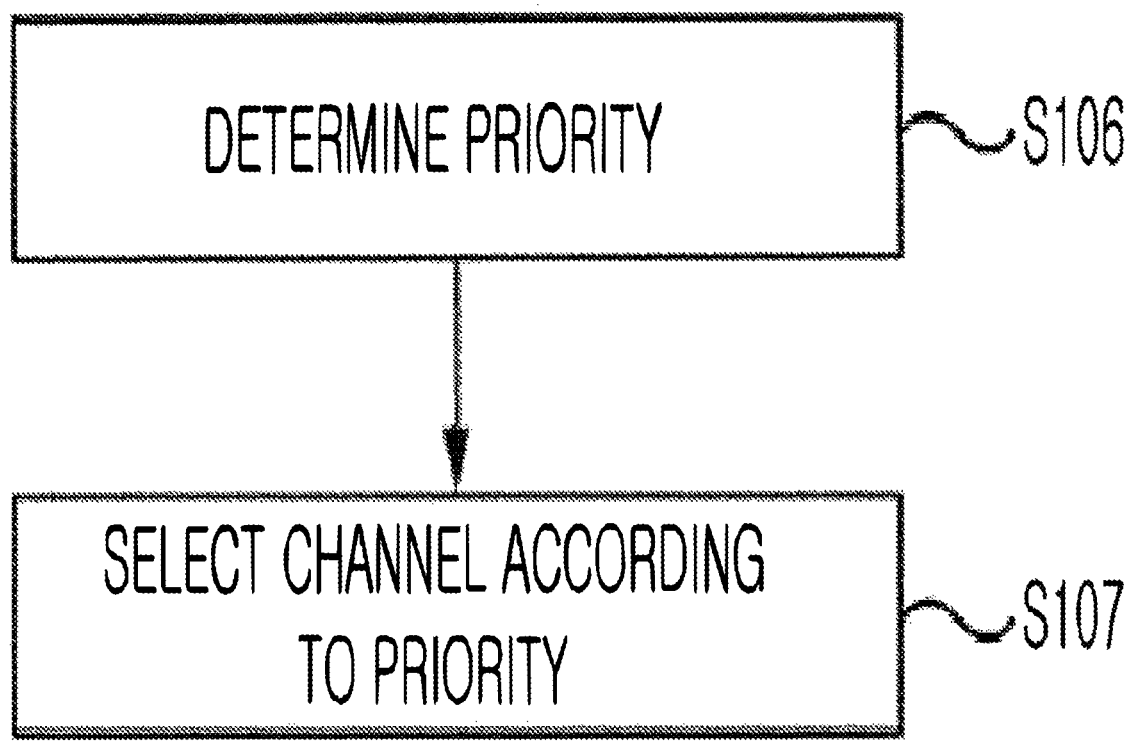
FIG. 3 is a flowchart illustrating a method for selecting a message transport channel and transmitting a message based on priorities according to an embodiment.

FIG. 3 is a flowchart illustrating a method for selecting a message transport channel and transmitting a message based on priorities according to an embodiment.

In operation S106, the server 100 may determine priorities of at least some of the one or more reception-available channels.

In an embodiment, the priorities may be determined based on economic efficiency of each of the one or more reception-available channels. For example, a channel that may transmit a message at a lower cost may have a higher priority.

Further, the priorities may be set based on the degree of a load of the system, or the priorities may be given based on order set by a user. When the priorities are given according to the order set by the user, the priorities may be given solely according to the order set by the user or the priorities may be calculated by assigning weights or additional points to a channel selected by the user.

In operation S107, the server 100 may select the at least one channel according to the determined priorities.

For example, the server 100 may transmit a message by selecting a channel having the highest priority among channels that the receiver can receive, and according to an embodiment, the server 100 may select a channel through which the message can be transmitted at the lowest cost and send the message therethrough according to an embodiment.

In another embodiment, the channels that the receiver may receive may include channels having different probabilities that the receiver may actually receive and check (or read) the message. Therefore, according to an embodiment, the server 100 may give a higher priority to a channel estimated for the receiver to have a high probability of checking the message or a channel estimated for the receiver to check the message quickly, among the channels that the receiver may receive.

In an embodiment, the priorities may be set based on economical efficiency, a probability that the receiver will check the message, a time when the receiver is expected to check the message, and the like.

In addition, the priorities may be determined by including various factors such as a data size, the presence of photo or a photo size, the presence of image (or image size), a load rate of the corresponding channel, or urgency of the transmission message, but are not limited thereto.

In an embodiment, the priorities may also be used to determine a message transmission order. For example, although there is an existing general awaiter who waits for transmission in a push (light-weight message) transmission queue (a space waiting for transmission), if a message with urgency is sent to the queue, the order may be changed such that the message prioritized in transmission order (waiting) is preferentially transmitted.

Figure 4:
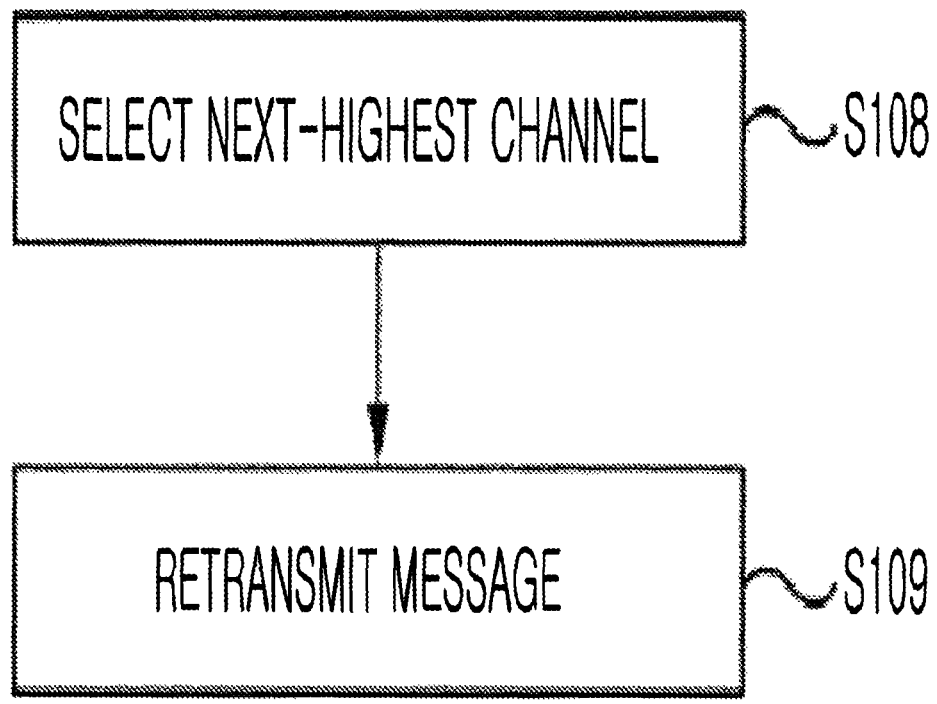
FIG. 4 is a flowchart illustrating a method for retransmitting a message according to an embodiment.

FIG. 4 is a flowchart illustrating a method for retransmitting a message according to an embodiment.

In operation S108, when the message transmitted through the selected channel cannot be provided to the receiver or is not checked by the receiver for a predetermined time, the server 100 may select a next-highest channel of the selected channel according to the determined priorities.

For example, in a case where a specific channel is selected and the message is transmitted to the receiver, if the receiver does not check the message for a predetermined time, the channel which is next in priority may be selected.

In operation S109, the server 100 may retransmit the message through the next-highest channel. Similarly, if the retransmitted message is not also checked for the predetermined time, the server 100 may retransmit the message through a next-highest channel again.

In an embodiment, when a message is repeatedly transmitted (or duplicated) through a plurality of channels, crosstalk may occur. Therefore, in the case of the repeated transmission, crosstalk may be prevented by deleting or deactivating a previously sent message.

In an embodiment, if the message is not yet downloaded by the receiver terminal 20, the server 100 may delete or deactivate the duplicate message.

If the message has already been downloaded to the receiver terminal 20, the server 100 may delete or deactivate the message if it has the authority to delete the message, and if there is no authority, the server may transmit information indicating that the message is duplicated to the receiver terminal 20.

Figure 5:
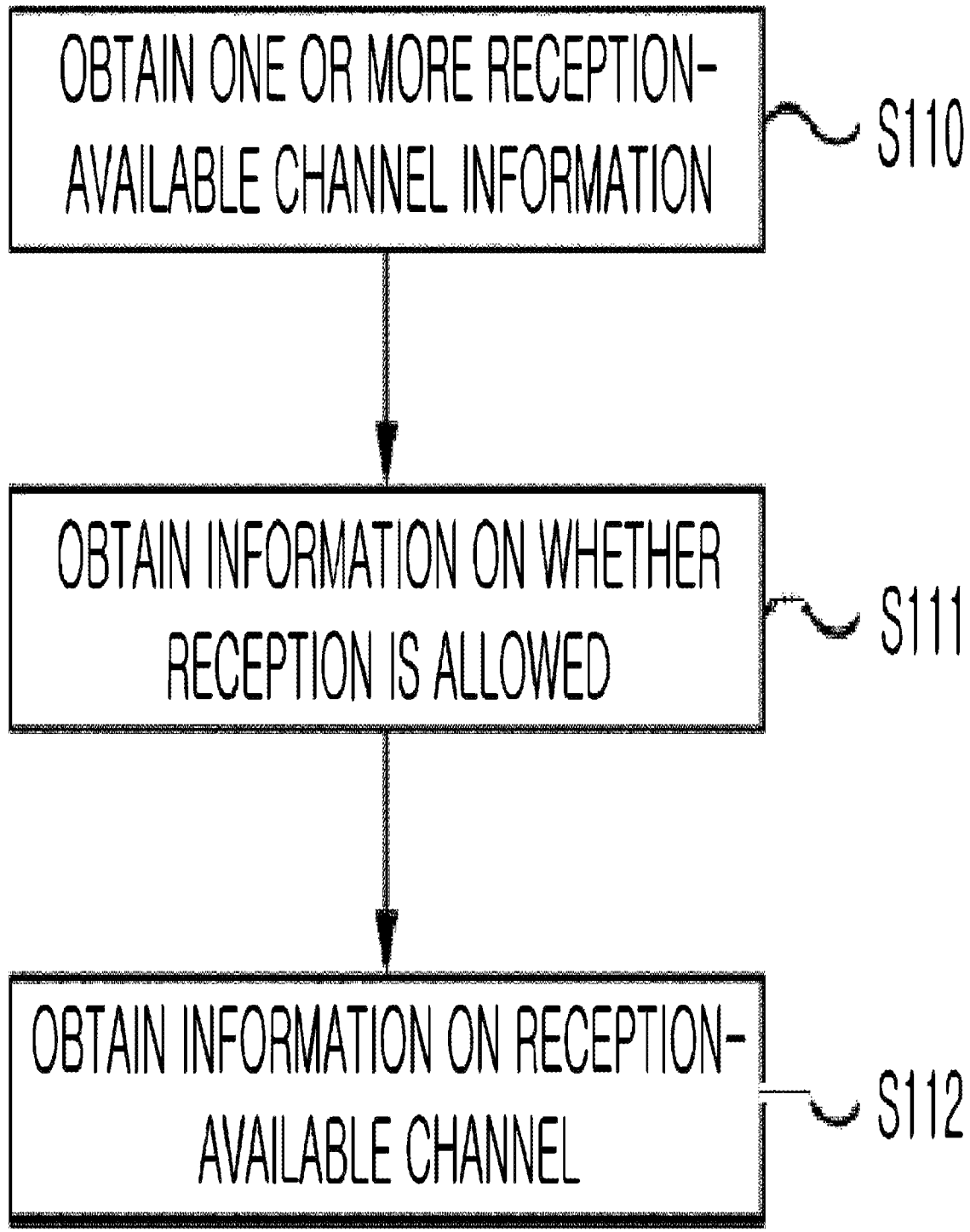
FIG. 5 is a flowchart illustrating a method for obtaining reception-available channel information according to an embodiment.

FIG. 5 is a flowchart illustrating a method for obtaining reception-available channel information according to an embodiment.

In operation S110, the server 100 may obtain information on one or more channels that the receiver can receive.

For example, the channel that the receiver can receive may be determined based on whether the receiver has subscribed to each site or application.

In operation S111, the server 100 may obtain information on whether the receiver allows reception on one or more channels that the receiver can receive.

For example, even if the receiver technically receives a channel, the receiver may have refused reception based on the channel. In this case, since it is not possible to transmit a message, and thus, the server 100 obtains in advance information on whether the user allows reception.

In operation S112, the server 100 may receive information on one or more reception-available channels that the receiver can receive and allows reception.

That is, the server 100 may increase a transmission probability of the message by selecting a channel that the receiver technically receives and that the receiver allows reception and transmitting the message therethrough.

In an embodiment, the server 100 may obtain information on one or more reception-available channels that can be received by the receiver's device, based on information on the type of the receiver's device and an application installed in the receiver's device.

For example, the server 100 may obtain information on available channels according to the type of the receiver's device, i.e., the type of the receiver terminal 20.

For example, the device information may include types of devices such as feature phones and smartphones, network information that devices may use, such as 2G, 3G, 4G, and 5G, operating system information of devices such as Android, ios, and Windows, and an application (program) installed in each device, but is not limited thereto.

Figure 6:
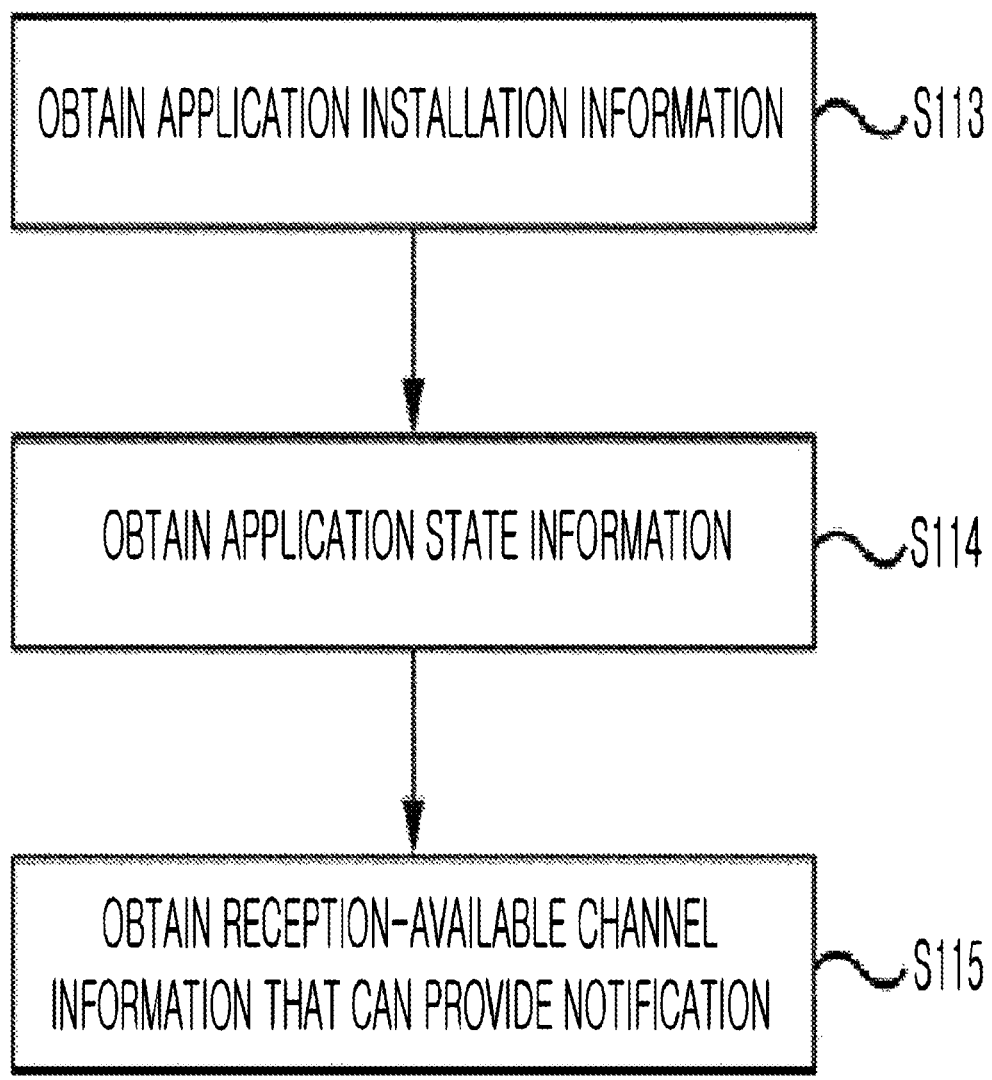
FIG. 6 is a flowchart illustrating a method for obtaining reception-available channel information according to another embodiment.

FIG. 6 is a flowchart illustrating a method for obtaining reception-available channel information according to another embodiment.

In operation S113, the server 100 may obtain information on a state of an application installed in the receiver's device.

For example, the server 100 may obtain information on an application installed in the receiver's device, as well as the receiver's device itself, and obtain information on the state of each application.

For example, the application may be installed in the receiver terminal 20 but may be deactivated, and push notification may not be allowed.

For example, even when a specific messenger application is installed and activated, a notification setting may be turned off. The server 100 may collect the corresponding information from the receiver terminal 20.

In addition, the application may not only be installed in the receiver terminal 20 but also push notification may be allowed. However, when a push notification request is received in a state in which the corresponding application operates at least one process in a background in the receiver terminal 20, it is necessary to additionally check whether or not the push notification can be provided.

For example, there may be a case where the background process of the corresponding application is forcibly terminated to save a battery in the receiver terminal 20. In this case, the push notification may not be provided even when a message is transmitted.

Therefore, the server 100 may determine whether the receiver terminal 20 is in a state in which it can provide a notification through the corresponding channel through communication with the receiver terminal 20 (e.g., the server 100 may first transmit a signal for determining whether a push message can be transmitted, for a test).

In operation S115, the server 100 may obtain information on one or more reception-available channels through which the receiver's device may provide a notification to the receiver, based on the information on the state of the application.

In the case of transmitting a message to the receiver's device, i.e., the receiver terminal 20, through a specific channel based on the obtained information, the server 100 may transmit the message through the channel determined for the receiver terminal 20 to provide a notification.

Accordingly, the server 100 may increase the probability that the transmitted message is checked by the receiver, and may increase a speed of checking the message.

Figure 7:
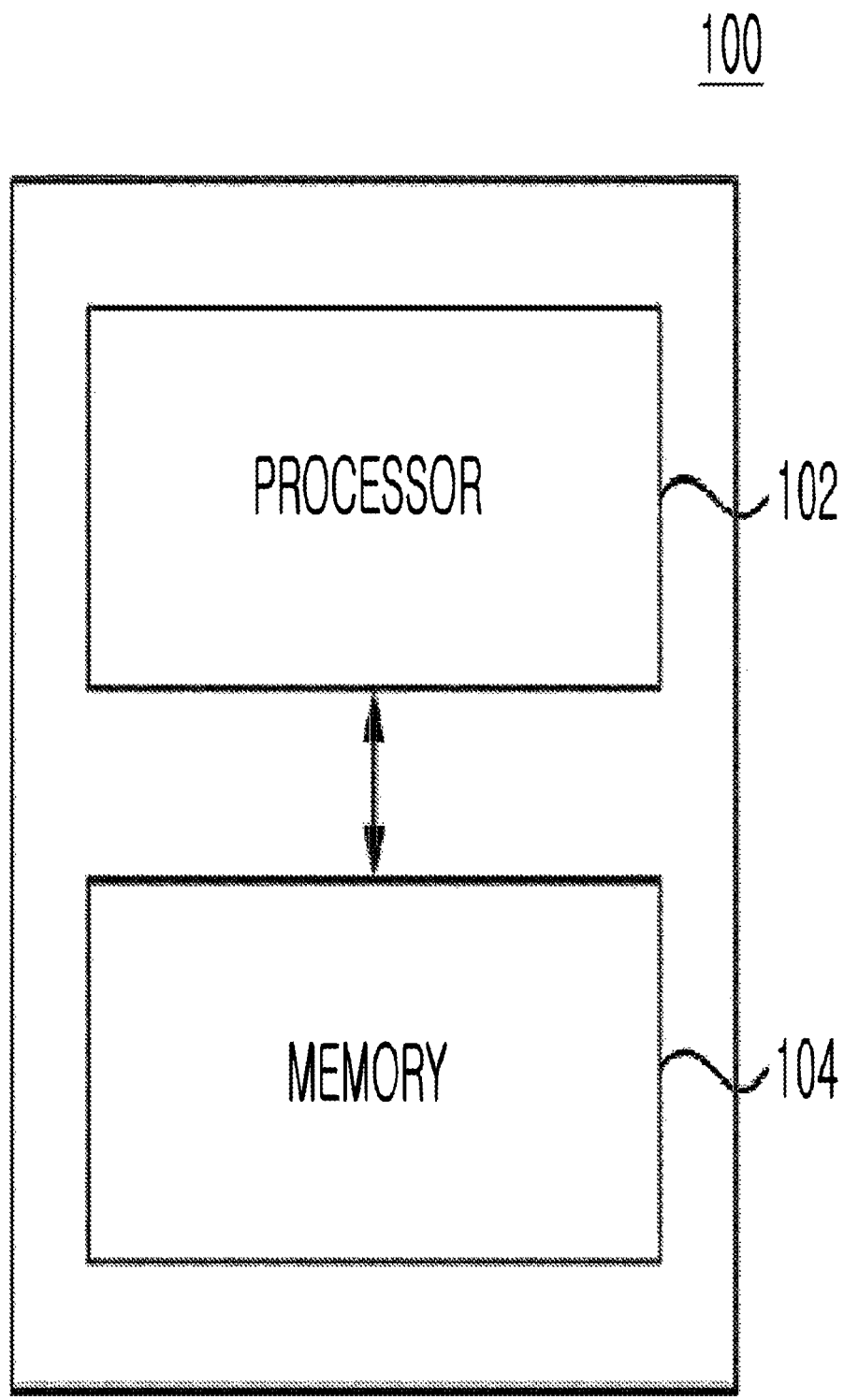
FIG. 7 is a block diagram of an apparatus according to an embodiment.

FIG. 7 is a block diagram of an apparatus according to an embodiment.

A processor 102 may include one or more cores (not shown), a graphic processor (not shown), and/or a connection passage (e.g., a bus, etc.) that transmits and receives signals with other components.

The processor 102 according to an embodiment executes one or more instructions stored in a memory 104 to thereby perform the method described above with reference to FIGS. 1 to 6.

For example, by executing the one or more instructions stored in the memory 104, the processor 102 obtains message information on a transmission target message, obtains receiver information including at least one of information on a receiver of the message and information on the receiver's device, obtains information on one or more reception-available channels based on the message information and the receiver information, selects at least one channel among the one or more reception-available channels, and transmits the message through the selected channel.

Meanwhile, the processor 102 may further include random access memory (RAM) and read-only memory (ROM) for temporarily and/or permanently storing a signal (or data) processed in the processor 102. In addition, the processor 102 may be implemented in the form of a system-on-chip (SoC) including at least one of a graphic processor, a RAM, and a ROM.

The memory 104 may store programs (one or more instructions) for processing and controlling of the processor 102. The programs stored in the memory 104 may be divided into a plurality of modules according to functions.

The steps of the method or algorithm described in connection with the embodiment of the present disclosure may be implemented directly in hardware, in a software module executed by hardware, or by a combination thereof. The software module may reside in a random access memory (RAM), read-only memory (ROM), erasable programmable ROM (EPROM), electrically erasable programmable ROM (EEPROM), flash memory, hard disk, removable disk, CD-ROM, or any form of computer-readable recording medium well known in the art to which the present disclosure pertains.

The components of the present disclosure may be embodied as a program (or an application) and stored in a medium for execution in combination with a computer as hardware. The components of the present disclosure may be implemented as software programming or software elements, and similarly, may be implemented in programming or scripting language such as C, C++, Java, an assembler, or the like including various algorithms implemented in combinations of data structures, processes, routines, or other programming constructs. The functional aspects may be implemented by an algorithm executed in one or more processors.

Although the embodiments of the present disclosure have been described above with reference to the accompanying drawings, a person skilled in the art to which the present disclosure pertains will understand that the present disclosure may be implemented in any other specific forms without changing the technical spirit or essential features thereof. Therefore, it should be understood that the embodiments described above are exemplary in all respects and not restrictive.

The invention claimed is:

1. A method for automatically selecting a message transport channel and transmitting a message, which is performed by a computing device, the method comprising:
    obtaining message information on a transmission target message;
    obtaining receiver information including at least one of information on a receiver of the message or information on a device of the message;
    obtaining information on one or more reception-available channels based on the message information and the receiver information, wherein the obtaining of the information on the one or more reception-available channels includes:
        obtaining information on one or more channels that can be received by a receiver's device based on information on a type of the receiver's device and an application installed in the receiver's device;
        obtaining information on a state of the application installed on the receiver's device; and
        obtaining information on one or more reception-available channels that can provide notification to the receiver in the receiver's device;
    automatically selecting, by the computing device, at least one of the one or more reception-available channels based on the information on the one or more reception-available channels; and
    transmitting the message via the selected channel.

2. The method for claim 1, wherein the selecting of the channel comprises:
    determining priorities of at least some of the one or more reception-available channels; and
    selecting the at least one channel according to the determined priorities.

3. The method for claim 2, wherein the determining of the priorities comprises determining the priorities based on economical efficiency of each of the one or more reception-available channels.

4. The method for claim 2, wherein the transmitting of the message comprises:
    selecting a next-highest channel of the selected channel according to the determined priorities if the message transmitted through the selected channel cannot be provided to the receiver or is not checked by the receiver for a predetermined time or longer; and
    retransmitting the message through the next-highest channel.

5. The method for claim 2, wherein the transmitting of the message comprises:
    selecting a next-highest channel of the selected channel according to the determined priorities if the message transmitted through the selected channel is not checked by the receiver for a predetermined time or longer; and
    retransmitting the message through the next-highest channel.

6. The method for claim 1, wherein the obtaining of the information on the reception-available channel comprises obtaining information on one or more reception-available channels available for transmitting the message based on at least one of a type or a capacity of the message.

7. The method for claim 1, wherein the obtaining of the information on the reception-available channel comprises:
    obtaining information on one or more channels that the receiver can receive;
    obtaining information on whether the receiver allows reception of the one or more channels that the receiver can receive; and
    obtaining information on one or more reception-available channels that the receiver can receive and that the receiver allows reception.

8. The method for claim 1, wherein obtaining message information comprises:
    determining an urgency of the message; and
    changing, in response to determining that the message is urgent, an order of a message queue such that the urgent message prioritized in transmission order is transmitted via the selected channel.

9. The method for claim 8, wherein the transmission of the message via the selected channel includes transmitting the prioritized message via the selected channel before the remaining messages in the message queue.

10. A message transport channel automatically selecting and message transmitting apparatus comprising:
    a memory configured to store one or more instructions; and
    a processor configured to execute the one or more instructions stored in the memory, wherein the processor performs, by executing the one or more instructions:
        obtaining message information on a transmission target message;
        obtaining receiver information including at least one of information on a receiver of the message or information on a device of the message;
        obtaining information on one or more reception-available channels based on the message information and the receiver information, wherein the obtaining of the information on the one or more reception-available channels includes obtaining information on one or more channels that can be received by a receiver's device based on information on a type of the receiver's device and an application installed in the receiver's device;
        obtaining information on a state of the application installed on the receiver's device;
        obtaining information on one or more reception-available channels that can provide notification to the receiver in the receiver's device;
        automatically selecting at least one of the one or more reception-available channels based on the information on the one or more reception-available channels; and
        transmitting the message through the selected channel.

11. The method for claim 10, wherein the obtaining message information on a transmission target message includes:
    determining an urgency of the message; and
    changing, in response to determining that the message is urgent, an order of a message queue such that the urgent message is prioritized in transmission order.

12. The method for claim 11, wherein the transmitting of the message through the selected channel includes transmitting the prioritized message through the selected channel before the remaining messages in the message queue.

13. A non-transitory computer-readable recording medium having stored thereon instructions, which, when executed by a computer, cause the computer to:
    obtain message information on a transmission target message;
    obtain receiver information including at least one of information on a receiver of the message or information on a device of the message;
    obtain information on one or more reception-available channels based on the message information and the receiver information, wherein the obtaining of the information on the one or more reception-available channels includes obtaining information on one or more channels that can be received by a receiver's device based on information on a type of the receiver's device and an application installed in the receiver's device;

obtaining information on a state of the application installed on the receiver's device;

obtaining information on one or more reception-available channels that can provide notification to the receiver in the receiver's device;

automatically select at least one of the one or more reception-available channels based on obtaining the information on the one or more reception-available channels; and transmit the message via the selected channel.

14. The method for claim 13, wherein the obtaining message information on a transmission target message includes:

determining an urgency of the message; and changing, in response to the determining that the message is urgent, an order of a message queue such that the urgent message is prioritized in transmission order.

15. The method for claim 14, wherein the transmitting the message via the selected channel includes transmitting the prioritized message via the selected channel before the remaining messages in the message queue.

* * * * *